US012266230B1

(12) United States Patent
Minsley et al.

(10) Patent No.: US 12,266,230 B1
(45) Date of Patent: Apr. 1, 2025

(54) SYSTEM AND METHOD FOR MANAGING PHYSICAL LOCKS WITH SINGLE RESET OR OVERRIDE DEVICE

(71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: Davinci Lock LLC, Raleigh, NC (US)

( * ) Notice: Subject to any disclaimer, the term of this patent is extended or adjusted under 35 U.S.C. 154(b) by 0 days.

(21) Appl. No.: 18/896,367

(22) Filed: Sep. 25, 2024

Related U.S. Application Data

(63) Continuation of application No. 18/512,286, filed on Nov. 17, 2023, now Pat. No. 12,131,602.

(51) Int. Cl.
*G07C 9/00* (2020.01)

(52) U.S. Cl.
CPC ..... *G07C 9/00817* (2013.01); *G07C 9/00309* (2013.01); *G07C 2009/0042* (2013.01); *G07C 2009/00825* (2013.01)

(58) Field of Classification Search
None
See application file for complete search history.

(56) References Cited

U.S. PATENT DOCUMENTS 3,822,396 A * 7/1974 Watase ..................... G07C 9/27 340/5.23
3,845,361 A * 10/1974 Watase .............. G07C 9/00571 361/172
4,870,400 A * 9/1989 Downs ..................... G07C 9/27 235/382
5,964,110 A * 10/1999 Crocco ................... E05B 9/086 70/369
6,331,812 B1 * 12/2001 Dawalibi ........... G07C 9/00817 340/5.1
7,047,773 B1 * 5/2006 Lin ....................... E05B 37/025 70/330
7,236,085 B1 * 6/2007 Aronson ................ G06Q 20/20 109/46
8,108,927 B2 * 1/2012 Michelle ................. G06F 21/31 713/193
8,774,714 B2 * 7/2014 Metivier ................. H02J 50/90 455/565
9,464,460 B2 * 10/2016 Lai .......................... E05B 37/14
9,524,600 B2 * 12/2016 Yong ........................ H04B 5/70
9,908,697 B2 * 3/2018 De Roquette Buisson ................ G05D 1/0022
10,124,765 B2 * 11/2018 Wilt .................... B60R 25/2018
10,142,843 B2 * 11/2018 Conrad ................. H04W 12/08
10,475,115 B2 * 11/2019 Minsley .................. G07F 17/12
10,581,850 B2 * 3/2020 Conrad ................. H04L 9/0891
10,614,646 B1 * 4/2020 Douglass ............... H01H 9/281

(Continued)

*Primary Examiner* — Carlos Garcia
(74) *Attorney, Agent, or Firm* — Williams Mullen; Thomas F. Bergert

(57) ABSTRACT

Embodiments of the present disclosure establish unlock codes for groups of physical locks and include a single code reset or override device to render the combination of each lock settable. In embodiments, based on a request to reset a first unlock code associated with one of the physical locks, a replacement unlock code is generated and transmitted to a mobile communications device, whereupon the first unlock code can be changed to the replacement unlock code.

13 Claims, 4 Drawing Sheets

(56) References Cited

U.S. PATENT DOCUMENTS

| | | | | |
|---|---|---|---|---|
| 10,614,650 | B2 * | 4/2020 | Minsley | G07C 9/00571 |
| 11,663,650 | B2 * | 5/2023 | Minsley | G07C 9/21<br>340/5.61 |
| 2002/0059114 | A1 * | 5/2002 | Cockrill | G06Q 20/10<br>705/40 |
| 2003/0061192 | A1 * | 3/2003 | McGunn | G07C 9/38 |
| 2003/0208647 | A1 * | 11/2003 | Kumar | G06F 9/3854<br>710/200 |
| 2004/0030934 | A1 * | 2/2004 | Mizoguchi | G06F 21/36<br>726/18 |
| 2005/0154605 | A1 * | 7/2005 | Tropp | E05B 35/105<br>70/21 |
| 2005/0216673 | A1 * | 9/2005 | Kumar | G06F 9/30185<br>712/225 |
| 2005/0237149 | A1 * | 10/2005 | Loftin | E05B 47/06<br>340/5.31 |
| 2005/0241003 | A1 * | 10/2005 | Sweeney | H04W 4/02<br>726/28 |
| 2007/0214369 | A1 * | 9/2007 | Roberts | G06F 21/79<br>713/192 |
| 2008/0246583 | A1 * | 10/2008 | Blake | G07C 9/27<br>340/5.7 |
| 2009/0083851 | A1 * | 3/2009 | Michelle | G06F 21/31<br>726/21 |
| 2009/0256676 | A1 * | 10/2009 | Piccirillo | G07C 9/00309<br>340/5.65 |
| 2013/0024528 | A1 * | 1/2013 | Gallant | H04L 12/1854<br>709/206 |
| 2013/0139408 | A1 * | 6/2013 | Chaiken | A43B 3/242<br>36/50.1 |
| 2013/0335193 | A1 * | 12/2013 | Hanson | G07C 9/00174<br>340/5.61 |
| 2014/0062656 | A1 * | 3/2014 | Bowen | H04W 12/082<br>340/5.61 |
| 2014/0207499 | A1 * | 7/2014 | Fliess | G06Q 10/02<br>705/5 |
| 2014/0207657 | A1 * | 7/2014 | Gacs | G06Q 30/0645<br>705/39 |
| 2014/0266585 | A1 * | 9/2014 | Chao | G07C 9/27<br>340/5.61 |
| 2015/0077223 | A1 * | 3/2015 | Pipes | G07C 9/33<br>340/5.54 |
| 2015/0078137 | A1 * | 3/2015 | Lee | G07C 9/27<br>367/198 |
| 2015/0186840 | A1 * | 7/2015 | Torres | A47F 10/02<br>705/339 |
| 2015/0356801 | A1 * | 12/2015 | Nitu | G07C 9/00904<br>340/5.61 |
| 2016/0063235 | A1 * | 3/2016 | Tussy | G06Q 20/3276<br>726/6 |
| 2016/0155293 | A1 * | 6/2016 | Reaves | G07F 17/3234<br>463/25 |
| 2016/0173595 | A1 * | 6/2016 | Miller | H04L 67/63<br>709/217 |
| 2017/0161978 | A1 * | 6/2017 | Wishne | G07F 17/14 |
| 2017/0236352 | A1 * | 8/2017 | Conrad | G01S 19/13<br>340/5.61 |
| 2018/0115595 | A1 * | 4/2018 | Krishnan | H04L 67/025 |
| 2018/0216364 | A1 * | 8/2018 | Wind | E05B 1/0007 |
| 2018/0230713 | A1 * | 8/2018 | Sidhu | E05B 67/003 |
| 2018/0253786 | A1 * | 9/2018 | Frisby | G07F 9/002 |
| 2018/0262891 | A1 * | 9/2018 | Wu | H04W 12/065 |
| 2018/0283046 | A1 * | 10/2018 | Uchida | E05B 19/00 |
| 2018/0350170 | A1 * | 12/2018 | Wang | G06F 1/3231 |
| 2019/0182669 | A1 * | 6/2019 | Conrad | G07C 9/00309 |
| 2019/0259232 | A1 * | 8/2019 | Nandakumar | G07C 9/00896 |
| 2019/0371101 | A1 * | 12/2019 | Friedli | G07C 9/38 |
| 2020/0190854 | A1 * | 6/2020 | Tropp | E05B 37/0034 |
| 2020/0318389 | A1 * | 10/2020 | Luo | E05B 35/105 |
| 2020/0378155 | A1 * | 12/2020 | Zhang | E05C 3/042 |
| 2022/0076514 | A1 * | 3/2022 | Lingala | H04W 4/80 |
| 2023/0039893 | A1 * | 2/2023 | Minsley | G06Q 20/14 |
| 2023/0306794 | A1 * | 9/2023 | Jefferies | G07C 9/00571 |

* cited by examiner

SYSTEM AND METHOD FOR MANAGING PHYSICAL LOCKS WITH SINGLE RESET OR OVERRIDE DEVICE

CROSS-REFERENCE TO RELATED APPLICATIONS

The present application is a continuation of U.S. patent application Ser. No. 18/512,286 filed on Nov. 17, 2023, the contents of which are hereby incorporated by reference in their entirety.

TECHNICAL FIELD

The present disclosure relates generally to the field of physical locks and more particularly to a system and method for managing physical locks.

BACKGROUND AND SUMMARY

Access control problems exist in different commercial and personal environments such as self-storage facilities, warehouses, marinas, businesses, cargo shipping, home rentals, recreational activity locations, sports clubs and other locations. Different types of assets, whether physical or virtual, may be protected from general access through an access control feature such as a physical lock.

In some environments, over-locks are used as a form of secondary lock. For example, self-storage units are typically rented on a monthly basis. If a customer is delinquent and does not pay rent to the self-storage facility owner by an agreed-upon due date, the owner (i.e., landlord) has a right to prevent the customer from accessing the storage unit. Self-storage facility owners typically place an over-lock over the storage unit door, such as through a hasp that prevents opening of the door. The over-lock is utilized until the customer pays the delinquent past due balance on their account.

The process of placing and removing physical locks of any kind, including over-locks, can be quite burdensome, particularly at locations which may be rented to month-to-month customers. Additionally, if a lock combination becomes compromised or forgotten, it can be time-consuming and burdensome to change out the lock or change the combination and provide the rightful owner with the new combination. These types of challenges exist in a variety of access control environments involving physical locks. In addition, the cost of conventional locks can be prohibitive. Many conventional locks including over-locks are electronic and provide automated and remote locking/unlocking functions. Such locks oftentimes require significant capital improvements at various types of locations. Furthermore, electronic locks inherently require constant power, and their continuous twenty-four hour per day operation increases power consumption costs at locations where installed. Furthermore, as with any complex electronic device, electronic locks are subject to failure and malfunction, and can require costly repairs to be conducted by an electrician, if not ultimately requiring replacement.

Standard combination locks are a type of conventional physical lock. However, with various facilities at different types of locations utilizing a limited number of standard combination locks, habitually delinquent customers eventually begin to recognize the unlock codes, and these locks can become futile. The facility must then perpetually replace locks when the unlock codes associated with those locks have become known and compromised.

Despite problems as described above, it can be helpful in various access control scenarios to employ physical locks with a single override for all locks to permit re-setting of a combination or other form of unlocking the physical locks, particularly in environments where it is necessary or helpful to not include lock identifiers on the physical locks.

According to embodiments of the present disclosure, a single override or code reset device is maintained among a group of physical locks to enable the combination or unlock code of all locks to be set or reset. In various embodiments, the override is a physical key or physical screwdriver. In other embodiments, the override is a form of electronic key such as a mobile communications device, for example.

In various embodiments, each lock in the group of locks does not include a lock identifier. Each lock can be a combination lock where a combination of numbers, letters, characters or symbols is employed to unlock the lock. The single override device can be employed to render the combination of each lock settable. For example, upon request such as where a user has forgotten a combination or where an unlock code has been compromised, a physical override key can be inserted into an appropriate keyhole in each of the physical locks and placed into a "set" position whereupon the combination of a given physical lock can be set. Once the combination is set, the key can be placed into a "finished" or "combination locked" position whereby the established combination is now fixed unless and until it is reset again in the future. In various embodiments, each lock is set to a different combination prior to deployment and/or use. At such time the combination is set for each lock, the combination and lock are stored such as in a database. In embodiments where the lock does not have a unique lock identifier, the combination can be associated with a given unit or location. The association with the unit could happen by entering and/or selecting a unit from within a related software program or scanning an identifier such as a quick response (QR) code on the unit or at a location for multiple units, for example. In the event a combination is forgotten, the user can request the combination in various ways, including by using a mobile communications device to request the unlock combination via a software application or via request to an external system.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims. In addition, the present disclosure describes, among other things, a lock and single override management system. Although the system is described with respect to its application in certain environments and locations, it is understood that the system could be implemented in any setting where access control may be useful.

It will be appreciated that reference to "a", "an" or other indefinite article in the present disclosure encompasses one or more than one of the described element. Thus, for example, reference to a lock may encompass one or more locks, a communications device may encompass one or more communications devices and so forth.

Figure 1:
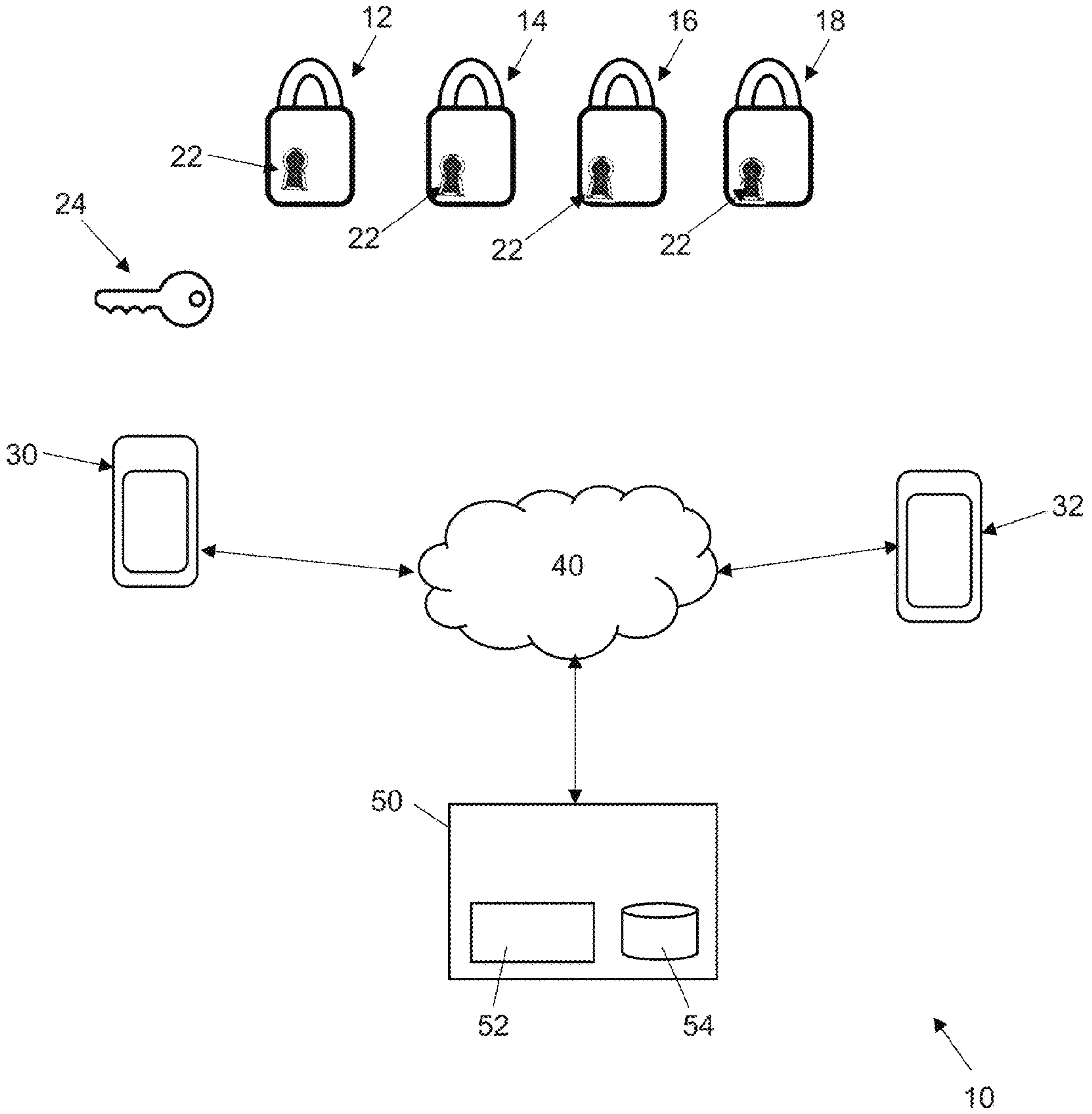
FIG. 1 is a schematic diagram of an embodiment of the present disclosure.

FIG. 1 is a schematic diagram of an access control system 10 in accordance with the present disclosure. In various embodiments, the system can be implemented in connection with a self-storage and/or other access control environments. A group of physical locks 12, 14, 16, 18 can be maintained within an access control environment. In various embodiments, the physical locks 12, 14, 16, 18 are "dumb" devices that are not electronically or electrically operable. Nevertheless, the physical locks 12, 14, 16, 18 may have a physical keyhole 22 provided thereon.

In embodiments where the physical locks include a keyhole 22, it will be appreciated that a single physical override key 24 can be provided which is operable to engage the keyhole 22 of each physical lock (e.g., 12, 14, 16, 18) in order to place the lock in a combination reset mode, whereupon a user can reset an established combination lock to accommodate a variety of scenarios. A set screw integrated into a physical lock is another physical item that can permit resetting of specific physical locks. In such devices, after the proper unlock code is entered, the set screw can be rotated such as with a screwdriver, thereby allowing the unlock code to be reset to a different code, after which the set screw can be rotated back to the original position, setting the lock to be opened only by the different, newly set code. Near field communication (NFC) technology can also be employed to electronically reset the unlock code according to various embodiments of the present disclosure where the physical lock is NFC capable. In such embodiments, a replacement unlock code can be generated by a lock management software application, which can be operable by a mobile communications device or a remote server, for example, wherein the software application generates or transmits the replacement unlock code for/to the mobile communication device. Once the replacement unlock code is generated by or received by the mobile communications device, the mobile communications device can be held up to the NFC-capable physical lock. Through near field communication, the mobile communications device charges the internal power source within the physical lock and transmits the replacement unlock code to a processor within the physical lock. The processor within the lock then executes a function to manipulate internal elements within the lock, such as a solenoid, worm screw, internal mechanics and/or circuitry to adjust lock setting elements such as internal pins of the physical lock so that the replacement unlock code will be usable to unlock the lock thereafter.

Resetting of the lock code can be employed in different situations. For example, a user may set or reset a combination lock once the lock is received and ready to be installed in an environment. A user may also reset a combination lock when the lock is being re-used by a different party from the original party to which the lock was assigned. Further, a user may reset a combination lock if the original or current combination has been compromised and unauthorized parties are able to open the lock and access assets intended to be protected via the lock. Even further, a user may reset a combination if an owner or customer has somehow forgotten the combination and provides one or more credentials indicating the owner or customer is the proper party to request a resetting of the combination to thereby give the owner or customer proper access. By providing a single override key 24, an operator or manager of an access-controlled facility can easily establish, maintain, operate and reset a large number of physical locks for a variety of purposes. Further, such environments do not require a label or lock identifier which, if included, may potentially compromise security if an unscrupulous party has knowledge of associated lock identifiers and unlock codes.

Figure 2:
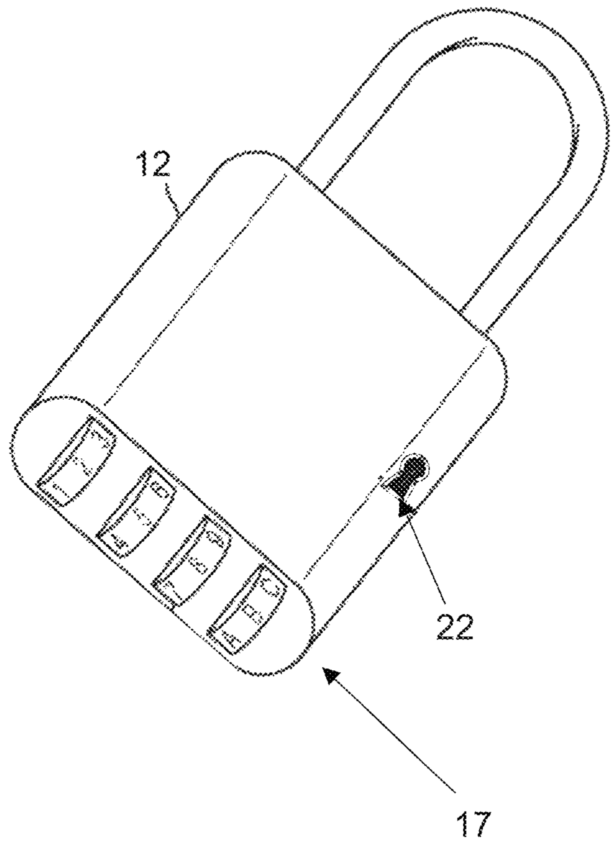
FIGS. 2 and 3 are embodiments of different physical locks in accordance with the present disclosure.
Figure 3:
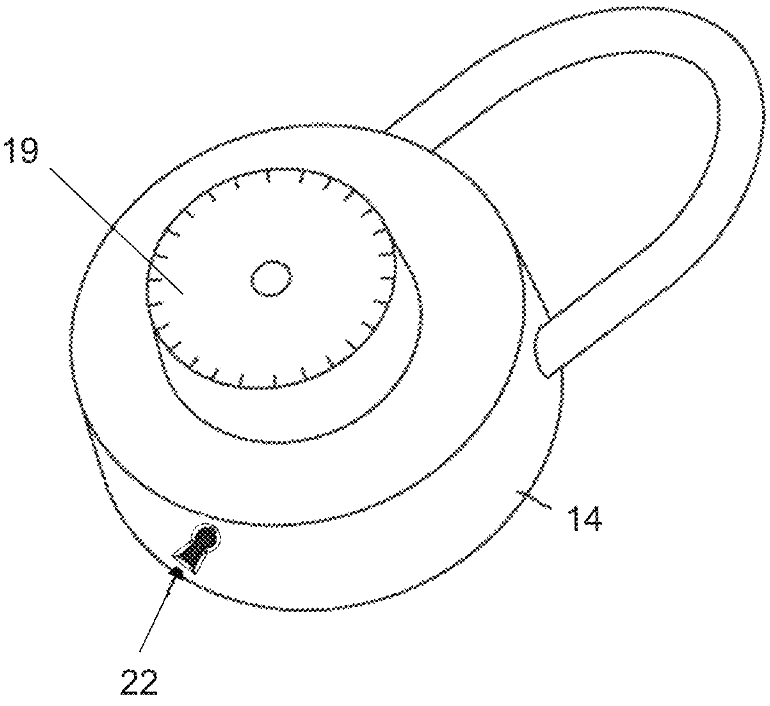

In various embodiments, a customer's access to a location is restricted by a physical lock 12, 14 as illustrated in FIGS. 2 and 3. In various embodiments, the lock 12 and/or 14 can be a deadbolt, knob lock, or lever lock that includes a combination mechanism. The combination mechanism can include a tubular barrel, a rotary knob, pushpins, or a mechanical keypad, for example. As shown in FIG. 2, one form of a lock 12 is a combination padlock with a tubular barrel 17 requiring the unlock code to be dialed for each digit individually. As shown in FIG. 3, another specific form of a lock 14 can be a lock with a rotary knob 19 that requires an unlock code to be manually dialed in order to open the lock 14. In another embodiment, the lock can be an electronic lock that accepts a combination input via digital keys or a touchscreen. In various embodiments, the lock is a lock with no electronic circuitry or electronic components, and the lock is not capable of electronic communication, whether with a remote or a local system. Locks 12 and 14 are shown with a keyhole 22.

In various embodiments, one or more users such as a customer or facility personnel can use a mobile communications device (e.g., 30, 32), such as a mobile phone, to access a software application available via, or having access to, an unlock code manager 50. The software application can be a proprietary program created and/or owned by a facility such as a self-storage facility, and which can be downloaded by the user via their device 30 and/or 32 from, for example, a website operated by or in communication with the unlock code manager 50, the Apple iTunes App Store®, the Android App Store®, and the like accessible over a network 40. The unlock code manager 50 can be part of a controlled access system (CAS) or in communication via network 40 with a CAS (not shown).

The software application can facilitate communication between the mobile device 30, 32 and the unlock code manager 50, which can be provided with a processor 52 and database 54, for example. The database 54 can store associated relationships between users, mobile communications devices, mobile telephone numbers, physical locks and/or unlock/combination codes, for example.

In various embodiments, the software application is a website accessed via one or more URLs using a browser on the mobile device 30 and/or 32. In such embodiments, the system can receive an indication from a communications device and thereafter provide access to a URL to the communications device such as via the software application. The system can further receive, via the URL, a credential associated with the customer and/or the communications device, determine whether the customer is authorized to reset and/or view the unlock code associated with the physical lock and, upon the customer being authorized to receive the unlock code, initiate actions to reset the code and/or display the unlock code at the web page accessed via the URL. In accordance with the present disclosure, the communications device, a customer account, and/or a customer mobile phone number can be associated with the physical lock and the unlock code in the database 54.

It will be appreciated that the mobile communications device 30, 32 is not limited to a mobile phone, and can include tablets, wearable devices, personal digital assistants (PDAs), laptop computers, "smart" watches, "smart" glasses, and any other device capable of receiving input from the customer, and which is capable of being connected to the network 40.

As exemplified above, the software application can include an interface that displays the unlock code. Upon seeing the displayed unlock code, the customer can then unlock the lock (12 or 14), and gain access to the desired access-controlled environment. In this way, if a user forgets an unlock code, or if an unlock code is reset such as described herein, the user can obtain the unlock code via a readily available mobile communications device to obtain access to a locked environment or location to which the user has permission to access. Further, while outside personnel may be involved in resetting an unlock code for a lock, outside personnel is not required to be present or otherwise participate in assisting the user with gaining access to the location, which may occur at a different time from the time when the unlock code was reset.

It will be appreciated that the unlock code manager 50 can be part of, or connected to, an access-controlled location or a management site via network 40. The management site can be remote from the access-controlled location and can serve multiple distributed access-controlled locations, such as in a central management site. In various embodiments, the management site can be located overseas, such as in a foreign call center.

Environments and/or locations in which embodiments of the present disclosure may operate include education and membership environments with locks on school lockers and/or sports club lockers, transportation environments with locks on cargo containers, utility environments with locks on natural gas meters, transformer boxes or other physical utility feature, marinas and boat storage environments with locks on boats such as may be used to secure the boats to a dock or a mooring piling, parcel delivery environments where locks are used to secure containers for at-home delivery, shared transport environments such as may be used for temporary use of bikes, scooters, and other forms of transportation, for example.

The network 40 may be any type of network suitable to allow interaction between devices, such as a mobile device 30, 32 located at the access-controlled location and the unlock code manager 50. For example, the network 40 may be a wired network, a wireless network, or any combination thereof. Further, the network 40 may include a distributed computing network, an intranet, a local-area network (LAN) and/or a wide-area network (WAN), or any combination thereof. For example, the LAN may make use of WIFI in its many variations and the WAN may make use of broadband, cellular and/or satellite networks using technologies including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies. However, those of ordinary skill in the art will appreciate that the network 40 is not limited thereto.

As used herein, the term "customer" can include a renter, client, tenant, lessee, user, or an authorized agent. Although the present disclosure may be described in instances with respect to self-storage facilities, it will be appreciated that embodiments of the present disclosure can be implemented in any setting where access control as secured by a lock may be useful, such as hotel rooms, apartment buildings, storage containers, short-term housing rentals, lockers and other environments as described herein, for example. In addition, the present disclosure can be implemented within a controlled access system (CAS), such as for equipment rooms, vaults, hospitals, airports, government facilities, nuclear power facilities, water treatment facilities, weapon storage facilities, aircraft cockpits, and any other setting that requires restricted, selective, or monitored access.

Upon certain circumstances occurring, such as where a customer forgets the unlock code or where an unlock code has been compromised and requires changing, embodiments as described herein can facilitate resetting and release of an unlock code for the lock.

In various embodiments, the unlock code manager 50 can determine if the customer is authorized to reset or view the unlock code. It will be appreciated that the customer can designate authorized parties beyond the customer to request a resetting of the unlock code and/or to receive the unlock code. For example, a customer's spouse, authorized agents, business associates, attorneys, and any other parties whom the customer wishes to have access to the access-controlled location can have their credentials associated with the access-controlled location. In such embodiments, the database record for the lock(s) at the access-controlled location includes a listing of all authorized parties and their respective credentials.

Figure 4:
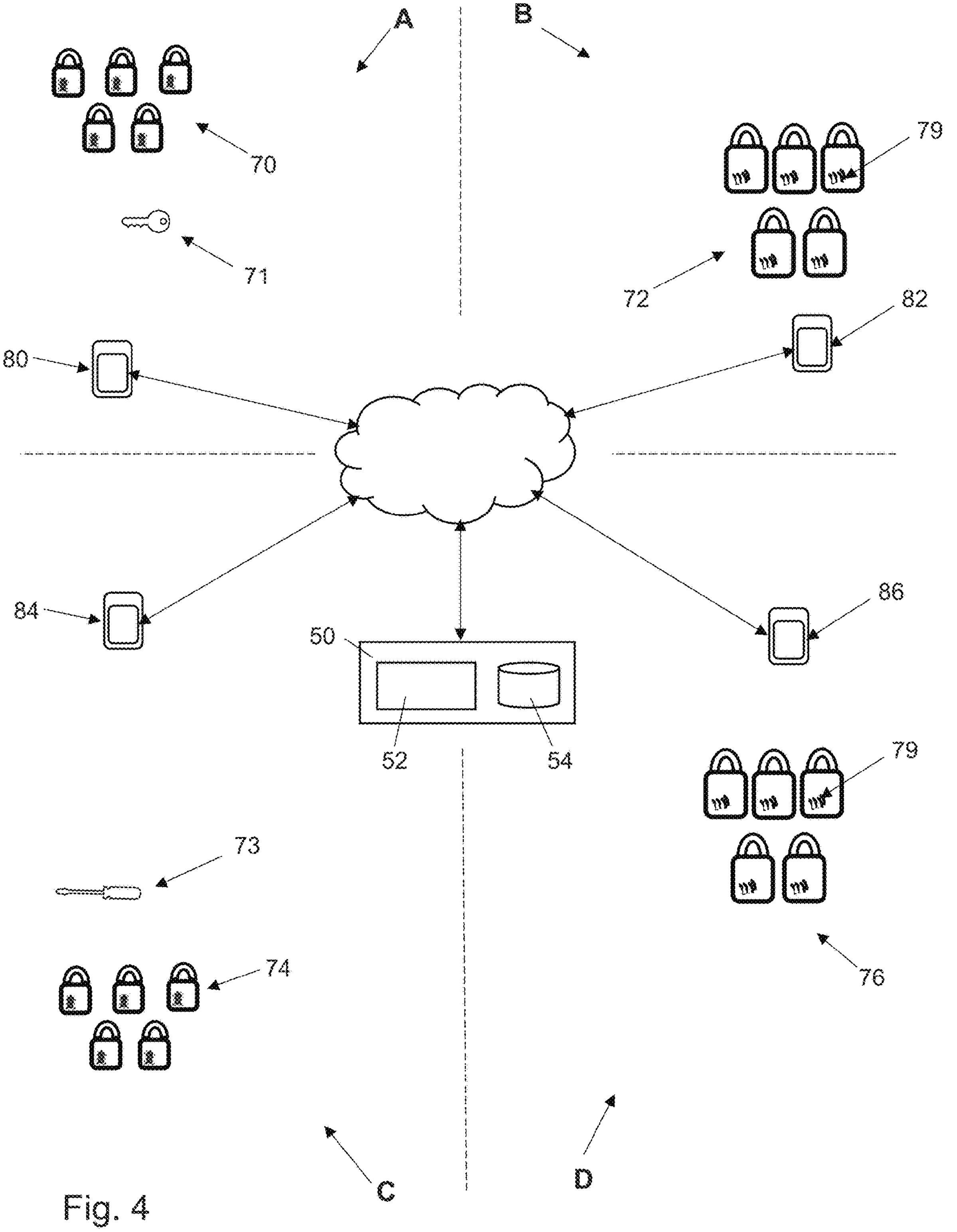
FIG. 4 is a schematic diagram of an embodiment of the present disclosure.

FIG. 4 is a schematic diagram illustrating multiple access-controlled environments A, B, C and D with different groups of physical locks. For example, environment A shows a group 70 of physical locks, environment B shows a group 72 of physical locks, environment C shows a group 74 of physical locks and environment D shows a group 76 of physical locks. A physical key 71 is provided which is operable to interact with all locks of the group 70 of physical locks in environment A, such as by insertion into a keyhole. A screwdriver 73 is provided which is operable to interact with all locks of the group 74 of physical locks in environment C, such as by insertion into a set screw in any of/all of the locks of group 74. The locks in each environment are adapted to restrict access to respective units within the environment. For example, group 70 of locks may be at a first physical location such as a school where each lock in the group 70 restricts access to a respective unit such as a physical locker. As another example, group 72 of locks may be at a second location (such as a marina) different from the first location and each lock in the group 72 restricts access to a respective unit such as a boat.

A communications device 80 is provided and associated with environment A, another communications device 82 is provided and associated with environment B, another communications device 84 is provided and associated with environment C and another communications device 86 is provided and associated with environment D. In various embodiments, two or more of devices 80, 82, 84, 86 can be the same device. In environment B, the group 72 of locks can be electronic locks capable of communication with a device such as communications device 82, which can be provided with programming for interacting with each lock of the group 72 to initiate a change in the unlock code for any given lock of the group 72 of locks. In environment D, the group 76 of locks can be electronic locks capable of communication with a device such as communications device 86, which can be provided with programming for interacting with each lock of the group 76 to initiate a change in the unlock code for any given lock of the group 76 of locks. In environments B and D, each lock in the respective groups 72, 76 may include an identifier 79 enabling the respective communications device 82, 86 to communicate with a specific lock. Such an identifier 79 can be a quick response (QR) code or a near field communication (NFC) tag, for example. Further, each lock in the groups 72, 76 of locks can include a processor and memory storing instructions facilitating communications with devices 82, 86 and unlock code manager 50 and further permitting an unlock code to be changed.

Thus, as shown in FIG. 4, embodiments of the present disclosure provide a single unlock code manager 50 for multiple facilities and/or environments (A, B, C, D) with a single override device for each environment (e.g., 71 in A, 73 in C, 82 in B and 86 in D). In various embodiments, the same override device can be used in multiple environments and/or locations. For example, a single entity may have multiple facilities (e.g., A and C in FIG. 4) controllable via a single override device, such as if physical key 71 and physical key 73 are the same key.

Figure 5:
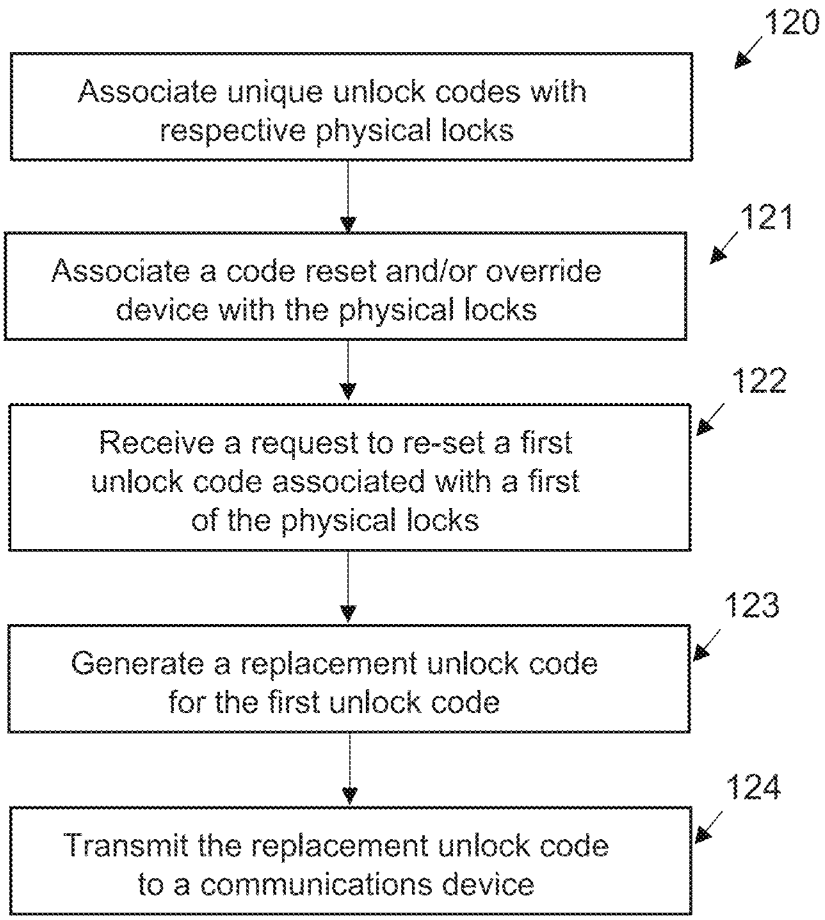
FIG. 5 is a flow diagram illustrating aspects of the present disclosure.

FIG. 5 is a flow chart illustrating processes in accordance with various embodiments of the present disclosure. As at 120 in FIG. 5, each lock of a group of physical locks is associated with a respective unlock code. Each of the physical locks is adapted to restrict access to a specific physical location such as an access-controlled facility. In various embodiments, each lock is incapable of electronic communication. Further, in various embodiments, each lock is not provided with a lock identifier to promote security. As described elsewhere herein, it will be appreciated that any element that provides an opportunity to specifically identify a physical lock is a potential security risk and that embodiments of the present disclosure that prohibit the association of lock identifiers with specific physical locks effectively remove that security risk. As at 121, a code reset and/or override device is associated with all of the physical locks. The system, unlock manager and/or software application on the mobile device can receive, as at 122, a request to reset an unlock code associated with one of the physical locks of the group of physical locks. Such a request may be from a mobile communications device 30 or 32 to the unlock code manager 50, for example. Alternatively, such a request may be from a first mobile communication device 32 to a second mobile communication device 30. For example, a customer may use device 32 to request that an onsite manager available through device 30 proceed to manually reset a lock associated with the customer. As at 123, a replacement unlock code is generated for the unlock code associated with the request. The replacement unlock code can be generated by software programming such as may be associated with the system, unlock manager 50 and/or mobile device (e.g., 30, 32). In other embodiments, the replacement unlock code can be generated by a user such as one or more personnel at or associated with a location where the physical locks are in place. For example, a user can self-generate an unlock code and use a key or other code resetting or override device to render the physical lock "settable", whereupon the generated replacement unlock code can then be set for the physical lock involved. The replacement unlock code can then be associated with the specific physical lock involved via communication between the user and the system, unlock manager and/or software application. Such communication can be via communications device such as a smartphone accessible by the user. As at 124, the replacement unlock code can be transmitted to a communications device such as a customer's communications device associated with the physical lock involved. Once the replacement unlock code is received, the customer can unlock the physical lock.

In various embodiments, an earlier unlock code such as the original unlock code is de-associated with a physical lock and the replacement unlock code is then associated with the physical lock in the database 54. In various embodiments, the request is received from the code reset and/or override device. In various embodiments, the code reset and/or override device is the mobile communications device. In various embodiments, the code reset and/or override device is different from the mobile communications device. For example, the code reset device can be a physical key, which can be provided with a processor, memory and display in various embodiments.

In various embodiments, associating each of the plurality of unlock codes with a respective physical lock from the group of physical locks involves receiving a selection of a respective physical location from a group of physical locations as presented in a graphical user interface (GUI) in communication with the database 54. For example, a user setting or resetting the unlock code(s) may have a GUI from a software application presented on a display of a mobile communications device such as 30, 32 in FIG. 1. The GUI may present one or more physical locations to which the group of physical locks may be associated, such as a first school from a group of schools within a county or community. The user may then select the individual school where the locks will be installed and the system can then store the associated unlock codes with the respective locks.

In various embodiments, each lock in the group of locks for a particular environment, location and/or facility does not include a lock identifier. Each lock can be a combination lock where a combination of numbers is employed to unlock the lock. A single override key can be employed to render the combination of each lock settable. For example, the key can be inserted into an appropriate keyhole in each of the physical locks and placed into a "set" position whereupon the combination of a given physical lock can be set. Thus, the physical key is operable to engage and/or interact with each of the physical locks at one or more given locations, facilities or environments, and the engagement of the physical key with any of the physical locks permits the previously (e.g., original) operable unlock code to be changed to a replacement unlock code.

Once the combination is set, the key can be placed into a "finished" or "combination locked" position whereby the established combination is now fixed unless and until it is reset again in the future. In various embodiments, each lock is set to a different combination prior to deployment and/or use. At such time the combination is set for each lock, the combination and lock are stored such as in a database 54 in FIG. 1. In embodiments where the lock does not have a unique lock identifier, the combination can be associated with a given unit or location. The association with the unit could happen by entering and/or selecting a unit from within the software or scanning an identifier on the unit or at a location associated with a group of units. In the event a combination is forgotten, the user can request the combination in various ways, including by using a mobile communications device to request the unlock combination via a software app or via request to an external system. For example, a user may employ a mobile communications device to detect an identifier such as by scanning a code or reading a tag at a location where one or more locks are located. The identifier is not on or integrated with a specific physical lock but is separate from each lock. After the identifier is detected, a specific unit number or other specific detail can be input into a user interface on the mobile device, whereupon the mobile device can then obtain the unlock code for the lock associated with the specific detail such as a unit number within a location, for example.

While embodiments of the present disclosure have been described whereby there are no unique lock identifiers associated with respective physical locks, it will be appreciated that embodiments of the present disclosure can operate with lock identifiers, such as described with respect to environments B and D in FIG. 4, for example. In such embodiments, associating each of the plurality of unlock codes with the respective physical lock of the plurality of physical locks involve scanning or reading a respective lock identifier.

In various embodiments such as with regard to environments A and C, the replacement unlock code can be displayed on a key override device such as 71, 73 operable to engage each of the locks. In various embodiments, the override device may be a communications device such as 82, 86 in FIG. 4 that is capable of electronic communication and may further be provided with a display operable to display one or more codes thereon.

In various embodiments, the unlock code can be a temporary unlock code which expires after a pre-determined period of time, or a one-time-use unlock code.

In certain embodiments in which the system includes a computing device, such as a mobile communications device, a CAS server, an unlock code manager, an electronic lock, etc., the computing device is any suitable computing device (such as a server) that includes at least one processor and at least one memory device or data storage device. As further described herein, the computing device includes at least one processor configured to transmit and receive data or signals representing events, messages, commands, or any other suitable information between the computing device and other devices. The processor of the computing device is configured to execute the events, messages, or commands represented by such data or signals in conjunction with the operation of the computing device.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A system, comprising:
- a first plurality of physical locks, wherein each of the first plurality of physical locks is adapted to restrict access to a respective unit at a first physical location and wherein each of the first plurality of physical locks is incapable of electronic communication;
- a first code reset device operable to interact with each lock in the first plurality of physical locks;
- a second plurality of physical locks, wherein each of the second plurality of physical locks is adapted to restrict access to a respective unit at a second physical location different from the first physical location;
- a second code reset device operable to interact with each lock in the second plurality of physical locks; and
- a processor; and
- a memory device storing a plurality of instructions which, when executed by the processor, cause the processor to:
  - store unlock codes associated with each of the first plurality of physical locks;
  - store unlock codes associated with each of the second plurality of physical locks;
  - change a first unlock code associated with a first lock of the first plurality of physical locks upon the first code reset device interacting with the first lock of the first plurality of physical locks to reset the unlock code associated with the first lock of the first plurality of physical locks; and
  - change a second unlock code associated with a first lock of the second plurality of physical locks upon the second code reset device interacting with the first lock of the second plurality of physical locks to reset the unlock code associated with the first lock of the second plurality of physical locks.

2. The system of claim 1, wherein the second plurality of physical locks are capable of electronic communication.

3. The system of claim 1, wherein the first code reset device is a physical key.

4. The system of claim 1, wherein the first code reset device is a screwdriver.

5. The system of claim 1, wherein the second code reset device is a communications device.

6. A method, comprising:
- associating each of a plurality of first unlock codes with a respective physical lock of a first plurality of physical locks, wherein each of the first plurality of physical locks is adapted to restrict access to a respective unit at a first physical location;
- associating a first code reset device with the first plurality of physical locks;
- associating each of a plurality of second unlock codes with a respective physical lock of a second plurality of physical locks, wherein each of the second plurality of physical locks is adapted to restrict access to a respective unit at a second physical location, wherein each of the second plurality of physical locks is adapted to restrict access to a respective unit at a second physical location different from the first physical location;
- associating a second code reset device with the second plurality of physical locks;
- changing an initial unlock code associated with a first lock of the first plurality of physical locks upon the first code reset device interacting with the first lock of the first plurality of physical locks to reset the initial unlock code associated with the first lock of the first plurality of physical locks; and
- changing an initial unlock code associated with a first lock of the second plurality of physical locks upon the second code reset device interacting with the first lock of the second plurality of physical locks to reset the initial unlock code associated with the first lock of the second plurality of physical locks.

7. The method of claim 6, wherein the first code reset device is operable to interact with each lock in the first plurality of physical locks and wherein the second code reset device is operable to interact with each lock in the second plurality of physical locks.

8. The method of claim 6, wherein the first and second plurality of physical locks are capable of electronic communication.

9. The method of claim 6, wherein the first and second plurality of physical locks are not capable of electronic communication.

10. The method of claim 6, wherein the first plurality of physical locks are not capable of electronic communication and wherein the second plurality of physical locks are capable of electronic communication.

11. The method of claim 6, wherein the first code reset device is a physical key.

12. The method of claim 6, wherein the first code reset device is a screwdriver.

13. The method of claim 6, wherein the second code reset device is a communications device.

* * * * *